(12) United States Patent
Hosokoshiyama et al.

(10) Patent No.: US 9,610,724 B2
(45) Date of Patent: Apr. 4, 2017

(54) DEVICE FOR INJECTION MOLDING A PREFORM

(71) Applicants: Hiroshi Hosokoshiyama, Tokyo (JP); Mamoru Sato, Tokyo (JP); Yasuhiro Ishizawa, Nasu-gun (JP)

(72) Inventors: Hiroshi Hosokoshiyama, Tokyo (JP); Mamoru Sato, Tokyo (JP); Yasuhiro Ishizawa, Nasu-gun (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 14/355,404

(22) PCT Filed: Oct. 19, 2012

(86) PCT No.: PCT/JP2012/077034
§ 371 (c)(1),
(2) Date: Apr. 30, 2014

(87) PCT Pub. No.: WO2013/065501
PCT Pub. Date: May 10, 2013

(65) Prior Publication Data
US 2014/0287079 A1    Sep. 25, 2014

(30) Foreign Application Priority Data

Oct. 31, 2011    (JP) .................................. 2011-239216

(51) Int. Cl.
*B29D 22/00*    (2006.01)
*B29C 49/22*    (2006.01)
(Continued)

(52) U.S. Cl.
CPC ........ *B29C 49/221* (2013.01); *B29C 45/1603* (2013.01); *B29C 45/1646* (2013.01);
(Continued)

(58) Field of Classification Search
CPC ... B29C 49/22; B29C 49/221; B29C 49/0078; B29C 49/0084; B29C 45/1603;
(Continued)

(56) References Cited

U.S. PATENT DOCUMENTS 8,607,999 B2 * 12/2013 Toyoda et al. ............... 215/12.2
2006/0141090 A1 * 6/2006 Lahouati .................... 425/326.1
2011/0108505 A1 * 5/2011 Toyoda et al. ............... 215/12.2

FOREIGN PATENT DOCUMENTS

JP    A-1-254539    10/1989
JP    A-2003-236919    8/2003
(Continued)

OTHER PUBLICATIONS

International Search Report issued in PCT/JP2012/077034 mailed Jan. 15, 2013.
(Continued)

*Primary Examiner* — Seyed Masoud Malekzadeh
(74) *Attorney, Agent, or Firm* — Oliff PLC

(57) ABSTRACT

A preform-molding device has a nozzle section including three cylindrical layer-forming flow channels, which include an inner flow channel and an outer flow channel for forming the substrate layers of the main resin, and a middle flow channel for forming the intermediate layer, and also includes a predetermined number of vertical blocking rib pieces disposed at a downstream end of the middle flow channel, in parallel in the circumferential direction, so that the intermediate layer would be segmented in the circumferential direction into a predetermined number of vertically running streams, wherein flow behavior of the intermediate-layer resin flowing through the middle flow channel is adjusted by positioning the vertical blocking rib pieces in the circumferential direction so as to minimize a difference in height between a maximum height point and a minimum height
(Continued)

point that appear in a leading edge of the intermediate layer of the preform.

1 Claim, 11 Drawing Sheets

(51) Int. Cl.
*B29C 45/16* (2006.01)
*B29C 49/00* (2006.01)
*B29B 11/10* (2006.01)
*B29C 49/06* (2006.01)
*B29C 45/00* (2006.01)
*B29B 11/08* (2006.01)
*B29K 67/00* (2006.01)
*B29K 77/00* (2006.01)
*B29B 11/14* (2006.01)
*B29L 9/00* (2006.01)
*B29L 23/00* (2006.01)
*B29L 31/00* (2006.01)
*B29K 105/00* (2006.01)

(52) U.S. Cl.
CPC .......... B29C 49/0078 (2013.01); B29C 49/22 (2013.01); *B29B 11/08* (2013.01); *B29B 11/10* (2013.01); *B29B 11/14* (2013.01); *B29B 2911/00* (2013.01); *B29B 2911/141* (2013.01); *B29B 2911/1404* (2013.01); *B29B 2911/14046* (2013.01); *B29B 2911/14073* (2013.01); *B29B 2911/14086* (2013.01); *B29B 2911/14093* (2013.01); *B29B 2911/14133* (2013.01); *B29C 45/0046* (2013.01); *B29C 49/0084* (2013.01); *B29C 49/06* (2013.01); *B29C 2045/1648* (2013.01); *B29C 2049/0089* (2013.01); *B29K 2067/003* (2013.01); *B29K 2077/00* (2013.01); *B29K 2105/258* (2013.01); *B29K 2995/0067* (2013.01); *B29L 2009/00* (2013.01); *B29L 2023/00* (2013.01); *B29L 2031/7158* (2013.01)

(58) Field of Classification Search
CPC .................... B29B 11/08; B29B 11/10; B29B 2911/14046; B29B 2911/14086; B29B 2911/14093; B29B 2911/141; B29B 2911/00
USPC .................... 264/241, 261; 425/131.1, 133.1
See application file for complete search history.

(56) References Cited

FOREIGN PATENT DOCUMENTS

| | | |
|---|---|---|
| JP | A-2010-12605 | 1/2010 |
| JP | A-2012-232463 | 11/2012 |

OTHER PUBLICATIONS

Written Opinion of the International Searching Authority issued in PCT/JP2012/077034 mailed Jan. 15, 2013.

* cited by examiner (a)

(b)

(a)

(b)

(a)

(b)

(a)

(b)

DEVICE FOR INJECTION MOLDING A PREFORM

TECHNICAL FIELD

This invention relates to a device for injection molding a preform in a shape of a test tube, in which an intermediate layer is laminated with, and embedded in, substrate layers made of a main resin, and especially to a nozzle used in this injection molding device.

BACKGROUND ART

Biaxially stretched, blow molded bottles made of polyethylene terephthalate (hereinafter abbreviated as PET) are in use in various fields, such as beverages, foods, cosmetics, and the like. In the use applications especially requiring a gas barrier property, the bottles to be used are made by laminating an intermediate layer comprising a gas barrier resin, such as a nylon resin, an ethylene-vinyl alcohol copolymer, etc., with substrate layers made of a PET resin, i.e., the main resin, in a manner embedded therein. Patent document D1 describes a biaxially stretched, blow molded bottle, in which an intermediate layer made of a nylon resin is laminated with substrate layers made of a PET resin, and a process for molding a laminated preform in a test tube shape, which is a primary molded product used to mold the bottle.

In these biaxially stretched, blow molded bottles having an intermediate layer made of a gas barrier resin, such as a nylon resin, etc., laminated with, and embedded in, the substrate layers made of a PET resin, the substrate layers of the PET resin are in tight contact with the intermediate layer of the gas barrier resin, but in many cases, these two types of layers are not adhered to each other. There might be a fear that both types of layers are partially delaminated by an action of shearing force as caused by, e.g., an impact of fall. And once there occurs partial delamination, such as described above, in the bottle for use in, for example, carbonated drinks, carbon dioxide gas permeates the inner layer of the PET resin, and goes into a space between the inner layer and the intermediate layer of the gas barrier resin. The pressure of carbon dioxide cause by the intrusion allows the delamination to proceed further. At some point, the delamination would become visible from outside because of light scattering or reflection on the delaminated interface and result in a problem of damaged appearance, which in turn, causes customers to have a concern for quality.

In this regard, the patent document D2 filed by the applicant of the present application describes an invention of a laminated bottle that has been made to solve the problem of delamination in the bottles having an intermediate layer, such as described above. FIGS. 11 and 12 show an example of the bottle described in the patent document D2. This bottle 601 has a neck 602, a neck ring 603, a shoulder 604, a body 605, and a bottom 606. As shown in a plane cross-sectional view of FIG. 12, the body wall in a height rage h2 has a laminar structure, in which an intermediate layer 613 made of a nylon resin is sandwiched between an outer layer 611a and an inner layer 611b, both of which are substrate layers 611 made of a PET resin. This bottle 601 is characterized in that the intermediate layer 613 is segmented into 16 strips in this embodiment in a circumferential direction by vertical connecting zones 614, where the outer layer 611a is connected directly with the inner layer 611b to form these vertical zones having no intermediate layer.

Even if any impact of fall causes the delamination to take place in this bottle 601 in one of the strips circumferentially segmented by the vertical connecting zones 614, the delamination can be prevented from occurring in adjacent strips by these vertical connecting zones 614. Since the delamination is limited locally, it is possible for the bottle to maintain good appearance in a transparent state.

FIGS. 13(*a*) and 13(*b*) show an embodiment of the preform in the shape of a test tube, to be used to biaxially stretch and blow mold the above-described bottle 601, in which FIG. 13(*a*) is a front view; and FIG. 13(*b*), a plane cross-sectional view taken along line D-D in FIG. 13(*a*). Like the bottle 601, this preform 501 has a laminar structure in which an intermediate layer 513 made of a nylon resin is laminated with substrate layers 511 made of a PET resin and is segmented by the 16 vertical connecting zones 514 disposed in parallel in a circumferential direction.

This preform 501 is molded by utilizing an injection molding device having a nozzle section, in which flow channels are disposed to allow the nylon resin to be formed into the intermediate layer 513 and to laminate it with the substrate layers made of the PET resin. Sixteen vertical blocking rib pieces are disposed in the circumferential direction with equal central angle intervals at an end on the downstream side of a cylindrical middle channel through which the nylon resin flows. These rib pieces inside the nozzle section segment the flow of the nylon resin into small streams in the circumferential direction to form 16 vertical connecting zones 514 in the body of the preform 501.

PRIOR ART REFERENCES

Patent Documents

Patent document D1: Japanese patent application No. 1989-254539

Patent document D2: Japanese patent application No. 2010-012605

SUMMARY OF THE INVENTION

Problems to be Solved by the Invention

In FIG. 13(*a*), a left half of the preform 501 shows an area of body wall laminated with the intermediate layer 513 in a cross-hatched pattern. A leading edge, LE, that is an uppermost end of the intermediate layer 513, and a trailing edge, TE, that is a lowermost end of the same layer, are shown in a simplified manner so that both of the LE and the TE may be located at certain height positions. In fact, however, for both of the leading edge, LE, and the trailing edge, LE, there are fluctuations in their height positions to a greater or lesser extent in the circumferential direction. Depending on the molding device and the molding conditions, the leading edge, LE, for example, may have a difference in height of 10 mm or even more between a maximum height point and a minimum height point.

Meanwhile, the neck 602 of the bottle 601 shown in FIGS. 11 and 12 is a portion that requires high dimensional accuracy so that no sealing property of the cap would be damaged. At the time when the preform 501 shown in FIG. 13 is injection molded, there is a case where the molding conditions are set in such a way that the maximum height point of the leading edge, LE, would come under the position of the neck ring 503 on an average, allowing for some sort of changes in the molding operation. Thus, attention should be paid to ensure that the intermediate layer 513 would not enter the height range of the neck 502 to eliminate abnormal deformation caused by the shrinkage or thermal crystallization treatment of the neck 502, now that such deformation may naturally takes place under the effect of the intermediate layer 513 that has extended to the neck 502.

Therefore, if there is any large change in the height position of the leading edge, LE, as described above, then at points other than the maximum height point, the leading edge, LE, would be at levels considerably lower than the neck ring 503. The preform 501 is stretched in the longitudinal direction generally by about three times in the biaxial stretching and blow molding operation. If the leading edge, LE, is located at 10 mm below the neck ring 503 at points other than the maximum height point, then in the bottle 601, the leading edge, LE, would be about 30 mm below the neck ring 603. In that case, a problem arises in that no satisfactory gas barrier property would be acquired.

Thus, the technical problem of this invention is to minimize fluctuations in the height position of the leading edge of the intermediate layer of the preform in the circumferential direction when the preform is molded by means of a device for molding a preform in the test tube shape by laminating substrate layers of a main resin with the intermediate layer, and especially by means of an injection molding device using a nozzle section in which the intermediate-layer resin is segmented in the circumferential direction into small streams by using a predetermined number of vertical blocking rib pieces that are disposed, in parallel in the circumferential direction, at a downstream end of the middle flow channel through which the intermediate-layer resin flows.

Means of Solving the Problem

A main feature associated with the injection molding device of this invention to solve the above-described technical problem is a device for injection molding a preform in a shape of a test tube used in a biaxial stretching and blow molding operation, in which at least one intermediate layer is laminated with substrate layers made of a main resin, the device having a nozzle section for laminating the main resin with a resin that forms the intermediate layer, said nozzle section comprising:

three cylindrical layer-forming flow channels disposed in a coaxial cylindrical configuration, which include:
an inner flow channel and an outer flow channel for forming the substrate layers of the main resin, and
a middle flow channel located between the inner flow channel and the outer flow channel and used to form the intermediate layer made of an intermediate-layer resin, which resin is distributed in a molten state to the middle flow channel by way of a manifold that comprises groove-like conduits, and
a predetermined number of vertical blocking rib pieces disposed at an end of the middle flow channel on a downstream side, in parallel in a circumferential direction, so that the intermediate layer would be segmented in the circumferential direction into a predetermined number of vertically running streams,
wherein flow behavior of the intermediate-layer resin flowing through the middle flow channel is adjusted by positioning the vertical blocking rib pieces in the circumferential direction so as to minimize a difference in height between a maximum height point and a minimum height point that appear in a leading edge of the intermediate layer of the preform.

According to the injection molding device having the above-described feature, a laminated preform can be formed for use in the biaxial stretching and blow molding operation. In this preform, the intermediate layer is laminated with the substrate layers to form a laminated area, which extends in a central axial direction and is segmented in the circumferential direction by the vertical connecting zones. This laminated preform can be biaxially stretched and blow molded to form a synthetic resin laminated bottle having the intermediate layer segmented into many strips in the circumferential direction by the vertical connecting zones. Even if delamination takes place in an area due to, e.g., an impact of fall, this delamination can be prevented by the vertical connecting zones from propagating into adjacent areas. Since the delamination is confined to a limited range, the bottle can maintain good appearance and a clear state.

If the height difference is to be minimized between the maximum point and the minimum point, it is necessary to adjust the flow behavior of the intermediate-layer resin passing through the middle flow channel and especially to control any circumferential fluctuation of the time at which the intermediate-layer resin reaches the downstream end of the cylindrical middle flow channel. If an intermediate layer having, for example, a gas barrier property is formed in the preform, the intermediate layer has a thickness of 1 mm at the largest. Because of such a thickness, it is technically difficult to adjust the resin flow behavior to give a uniform flow speed along the circumference by means of clearance adjustment for the cylindrical flow channel or by using a mandrel in a groove shape. It is especially difficult to effectively control any circumferential fluctuation of the time at which the resin reaches the downstream end of the cylindrical middle flow channel.

The main feature described above includes a following aspect: "wherein flow behavior of the intermediate-layer resin flowing through the middle flow channel is adjusted by positioning the vertical blocking rib pieces in the circumferential direction so as to minimize a difference in height between a maximum height point and a minimum height point that appear in a leading edge of the intermediate layer of the preform." This involves utilizing the vertical blocking rib pieces to segment the intermediate layer into small streams in the circumferential direction, and more specifically, utilizing, a difference in resin flow behavior between the positions of the vertical blocking rib pieces and the positions of slits between two adjacent rib pieces, and adjusting the flow behavior of the intermediate-layer resin passing through the cylindrical flow channel, so as to control any circumferential fluctuation of the time at which the intermediate-layer resin reaches the downstream end of the cylindrical middle flow channel.

The number and shape of the vertical blocking rib pieces can be determined by giving consideration to an inhibitive effect on the bottle against the progress of delamination between the substrate layers and the intermediate layer, the injection molding property and biaxial stretching and blow molding property of the preform, and the gas barrier property of the bottle. If the injection molding property and the biaxial stretching and blow molding property of the preform are taken into consideration, it is preferred that the vertical blocking rib pieces are disposed uniformly in the circumferential direction at intervals of an equal central angle.

Once the number of the vertical blocking rib pieces is determined by considering the above-described factors including the inhibitive effect against the progress of delamination, the next step is to find what central angle positions on the central axis of the middle flow channel is effective for the predetermined number of vertical blocking rib pieces, which are disposed at certain intervals in the circumferential direction to minimize the high and low height points of the leading edge. These central angle positions can be determined relatively easily by calculating flow states by computer simulation, making experimental samples of the portions constituting the middle flow channel of the nozzle section, based on the results of the simulation, and repeating the experiments.

According to the feature of the injection molding device of this invention, the preform can have various laminar structures, such as 2-resins/3-layers, 2-resins/5-layers, 3-resin/4-layers, 3-resins/5-layers, and the like. This can be achieved by increasing the number of cylindrical flow channels in the nozzle section appropriately within a scope of the feature that both sides of any intermediate layer are laminated with the substrate layers.

Another feature of this invention associated with the injection molding device is that, in the main feature described above, a predetermined number of the vertical blocking rib pieces is disposed in the circumferential direction in such a way that one of this number of the vertical blocking rib pieces is located at a circumferential position corresponding to a position where the maximum height point of the leading edge of the preform is likely to appear.

As described above, the cylindrical middle flow channel has small clearance. Thus, it is difficult to effectively control any circumferential fluctuation of the time at which the resin reaches the downstream end of the cylindrical middle flow channel, by adjusting this clearance or the mandrel in the groove shape. Even in the case where a nozzle having no vertical blocking rib piece is used, the leading edge tends to give a peak of the maximum height point at one location in the circumferential direction of the preform.

In many cases, the circumferential position where the maximum height point of the leading edge of the preform is likely to appear corresponds also to the circumferential position where the resin flowing through the middle flow channel reaches the downstream end in a shortest period of time. If one of the vertical blocking rib pieces is located at a circumferential position corresponding to the position where the maximum height point of the leading edge of the preform is likely to appear, then any possible fluctuation of the time, at which the resin reaches the downstream end of the middle flow channel in the shortest period of time, can be controlled all around the circumference by delaying this time of arrival. As a result, it becomes possible to control the peak height, that is, the minimum height point, of the leading edge and to minimize the difference in height between the maximum height point and the minimum height point that appear in the leading edge of the intermediate layer.

The intermediate layer is formed in the middle flow channel. When this layer joins the substrate layers formed in the inner and outer flow channels, the intermediate layer is affected by the flow of these substrate layers. As a result, there may be misalignment between the circumferential position at which the resin reaches the downstream end in the shortest period of time and the circumferential position where the maximum height point of the leading edge of the preform appears. Even in such a case, both positions are in a relationship of one-to-one correspondence. Therefore, at first, one of the vertical blocking rib pieces is set at a circumferential position similarly corresponding to the circumferential position of the maximum height point of the leading edge. Then, the angular position of this rib piece is finely adjusted. In this manner, all the predetermined number of the vertical blocking rib pieces can be set at positions where the difference in height is minimized reliably between the maximum and minimum height points of the leading edge.

Still another feature of this invention associated with the injection molding device is that, in the main feature described above, the vertical blocking rib pieces are disposed in the circumferential direction in such a way that one of the predetermined number of the vertical blocking rib pieces is located at a circumferential position opposed by 180 degrees to the position of an inflow port, which is disposed at an upstream end of the manifold to allow the intermediate-layer resin to flow into the middle flow channel.

The inventors of this application acquired the idea of this feature when they discovered that, in many cases, the intermediate-layer resin reaches the cylindrical downstream end most rapidly at a circumferential position opposed by 180 degrees to the position of the inflow port disposed at the upstream end of the manifold and that a maximum height point of the leading edge appears as a peak at a circumferential position of the preform corresponding to this opposite position.

Thus, when the positions of the vertical blocking rib pieces are adjusted in the circumferential direction in such a way that one of the vertical blocking rib pieces is located at a circumferential position opposed by 180 degrees to the position of the inflow port disposed at the upstream end of the manifold, it becomes possible in many cases to control the peak height, that is, the maximum height point, of the leading edge and to minimize the difference in height between the maximum height point and the minimum height point that appear in the leading edge of the intermediate layer. By the way, the maximum and minimum height points would have a largest difference in height if a gap between two adjacent rib pieces is located at the circumferential position opposed by 180 degrees to the position of the inflow port, through which the intermediate-layer resin flows into the middle flow channel. Furthermore, the above feature can be the first matter to be checked up in determining the circumferential positions of the vertical blocking rib pieces so as to minimize the difference in height of the leading edge.

Effects of the Invention

This invention having the above-described feature has the following effects: "A predetermined number of the vertical blocking rib pieces is disposed in the circumferential direction in such a manner that one out of this number of the vertical blocking rib piece is located at a circumferential position corresponding to the position where the maximum height point of the leading edge of the preform is likely to appear." This feature involves utilizing the vertical blocking rib pieces to segment the intermediate layer into small streams in the circumferential direction, and adjusting the flow behavior of the intermediate-layer resin passing through the cylindrical flow channel, so as to control any deviation, in the circumferential direction, of the time at which the intermediate-layer resin reaches the downstream end of the cylindrical flow channel. Depending on the positions of the vertical blocking rib pieces disposed in the circumferential direction, these rib pieces perform an adjusting function on the flow behavior of the intermediate-layer resin, control any possible circumferential deviation of the time, at which the resin passes through the cylindrical flow channel and reaches the downstream end, control the peak height, that is, the maximum height point that appear in the leading edge of the preform, and minimize the difference in height between the maximum height point and the minimum height point.

BRIEF DESCRIPTION OF THE INVENTION

MODE OF CARRYING OUT THE INVENTION

Figure 1:
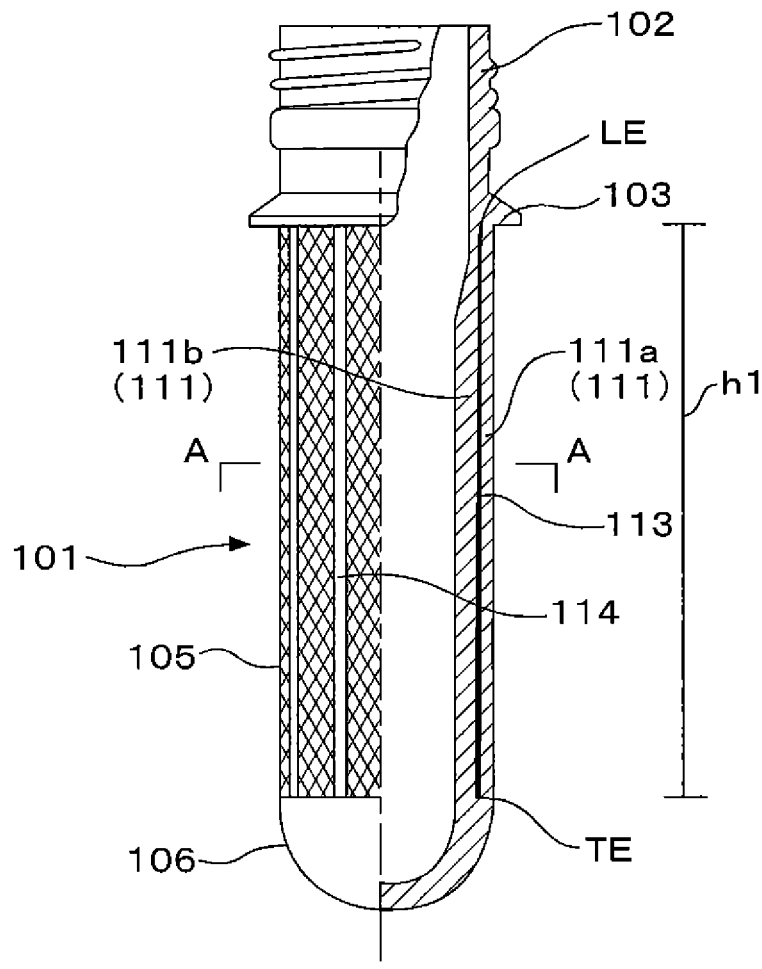
FIG. 1(a) is a front view, with a part in vertical section, of an embodiment of the preform formed by the injection molding device of this invention.
FIG. 1(b) is a cross-sectional view taken along line A-A in FIG. 1(a).
Figure 1:
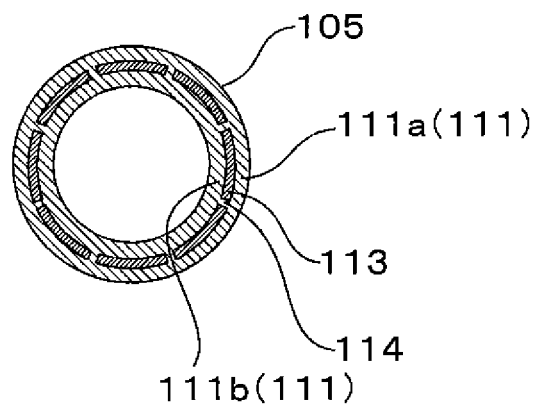

The injection molding device of this invention and the preform molded by using this device are further described with respect to preferred embodiments, now referring to the drawings, in which FIGS. 1(a), 1(b), and 2(a) show an embodiment of the preform 101 molded by the later-described injection molding device of this invention. FIG. 1(a) is a front view, with a partial vertical section, and FIG. 1(b) is a plane cross-sectional view of the preform 101. FIG. 2(a) is a schematic explanatory diagram showing fluctuations in the height of the leading edge, LE, of the intermediate layer 113 observed in the circumferential direction. This preform 101 in a shape of a test tube is made by using a PET resin as the main resin, and comprises a neck 102, a neck ring 103, a cylindrical body 105, and a bottom 106. The laminated areas of the intermediate layer 113 are shown as cross-hatched areas in FIGS. 1(a) and 2(a).

This preform 101 has a laminar structure in a predetermined height range h1 (a height range from right under the neck ring 103 to an upper end of the bottom 106 in this embodiment). As shown in the plane cross-sectional view of FIG. 1(b), the laminar structure comprises an intermediate layer 113 of a gas barrier resin, which is laminated with an outer layer 111a and an inner layer 111b, both of which are substrate layers 111 made of the main resin of a PET resin. The gas barrier resin in use is polyxylylene diamine adipamide (MXD6 nylon) (Hereinafter referred to as the nylon resin). As found in FIGS. 1(a) and 1(b), the intermediate layer 113 is segmented in the circumferential direction by eight vertical connecting zones 114, where the outer layer 111a, a substrate layer 111, is connected to the inner layer 111b, another substrate layer 111. The eight vertical connecting zones 114 are disposed in parallel in the circumferential direction and vertically along the central axial direction.

In FIG. 1(a), a leading edge, LE, that is an uppermost end of the intermediate layer 113, and a trailing edge TE that is a lowermost end of the same layer, are shown in a simplified manner so that both of the LE and the TE may be located at certain height positions. In fact, however, there are fluctuations in these height positions to a greater or lesser extent in the circumferential direction. FIG. 2(a) is a front enlarged view of an upper half of the preform 101 shown in FIG. 1(a) and is a schematic explanatory diagram showing fluctuations in the height of the leading edge, LE, of the intermediate layer 113. As shown in this FIG. 2(a), the intermediate layer 113 is divided into 8 regions in the circumferential direction by the vertical connecting zones 114, and each region has a peak of the leading edge, LE, at a laterally central position. If the peaks of all the regions are connected by a dashed-dotted line (also by a dotted line at the rear), an envelope curve L1 is obtained. Generally, a maximum height point, Pmax, of the leading edge, LE, comes to the front of the preform 101 in FIG. 2(a). A minimum height point, Pmin, comes to a rear position opposed by 180 degrees to the front. Other peaks are located between the Pmax and the Pmin, with varied heights.

In the preform 101 of this embodiment, a height difference, hd, between the maximum height point Pmax and the minimum height point Pmin gives an average value of 6.0 mm from the measurements based on many molded preforms. Like FIG. 2(a) showing the preform of this embodiment, FIG. 2(b) is another schematic explanatory diagram showing fluctuations in the height of the leading edge, LE, of the preform 101 in a comparative example prepared separately. In this case, the height difference, hd, reaches a value of 10.0 mm, as calculated from the difference between the maximum height point, Pmax, and the minimum height point, Pmin on the envelope curve L2.

FIGS. 2(a) and 2(b) are typical examples of the fluctuations in the height of the leading edge, LE, in the circumferential direction, in which the maximum height point, Pmax, forms a peak at the front of the preform 101 while the minimum height point, Pmin, is located at the rear, a position opposed by 180 degrees to the front, with other height points showing gradual changes in the circumferential direction between the Pmax and the Pmin. However, depending on the groove shape of the manifold 14b, there are many other cases in which the height positions of the leading edge, LE, are roughly flat in the circumferential direction, with the peak of Pmax appearing at one point on the envelope curve.

Figure 3:
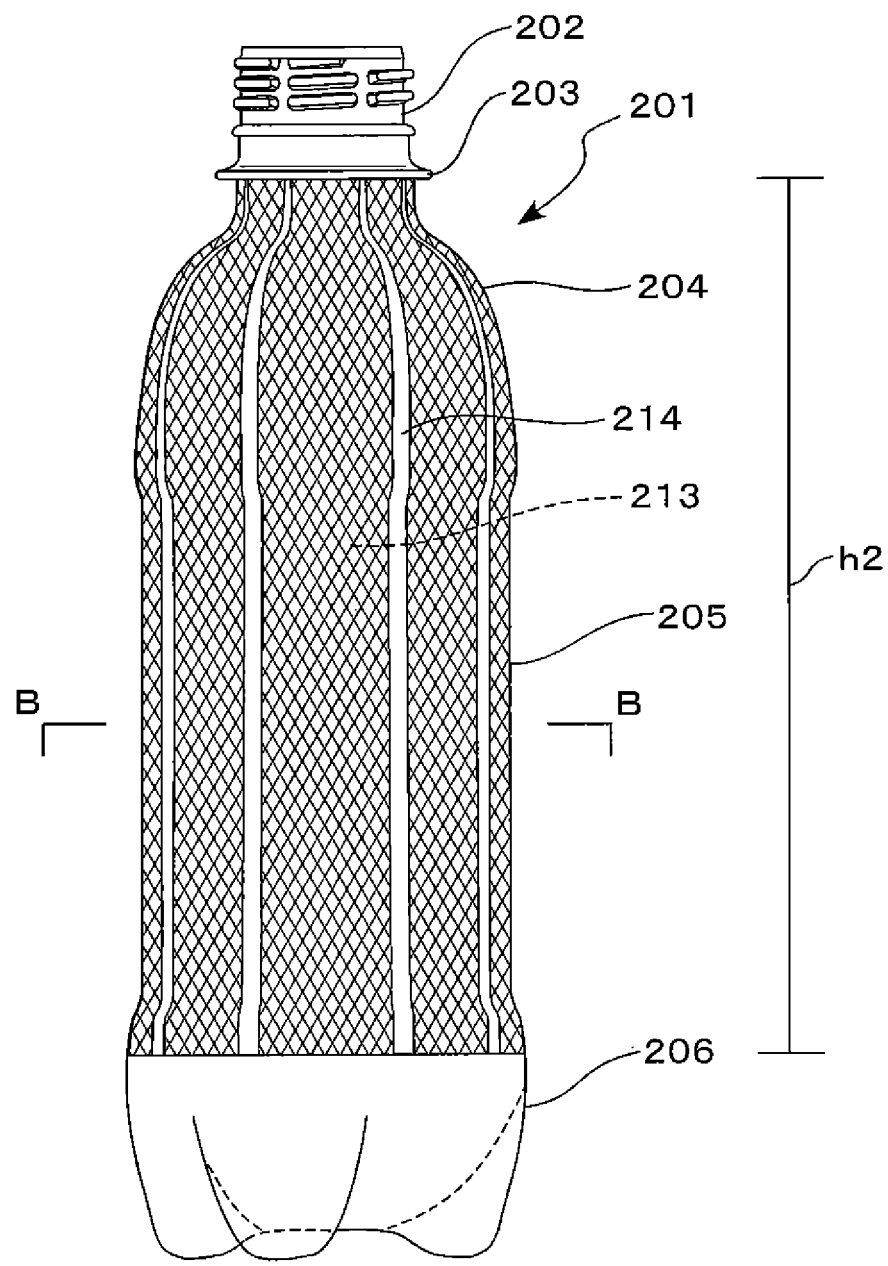
FIG. 3 is a front view of the bottle biaxially stretched and blow molded from the preform of FIG. 1.
Figure 4:
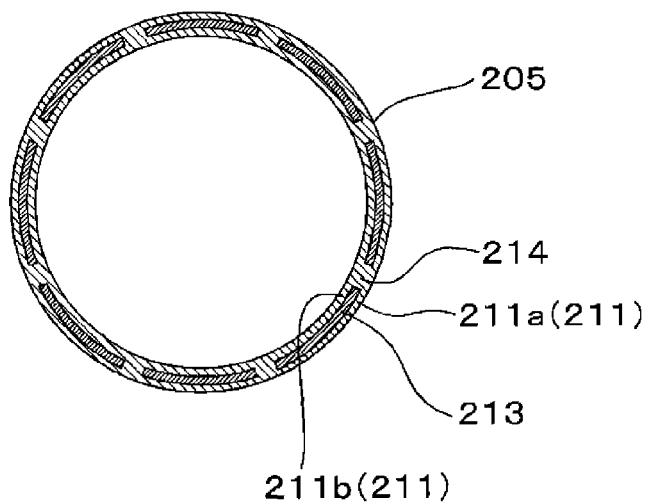
FIG. 4 is a cross-sectional view of the bottle of FIG. 3, taken from line B-B shown in FIG. 3.

FIGS. 3 and 4 show an embodiment of the bottle biaxially stretched and blow molded from the preform 101 of FIG. 1, in which FIG. 3 is a front view, and FIG. 4 is a plane cross-sectional view taken from line B-B in FIG. 3. This bottle 201 is a so-called pressure resistant PET bottle, which is made by using a PET resin as the main resin and is used as a container, for beverages containing a carbonated ingredient. The bottle comprises a neck 202, a neck ring 203, a shoulder 204, a cylindrical body 205, and a bottom 206 having a so-called petaloid shape with extended multiple feet.

In a predetermined height range of this bottle 201 (from just under the neck ring 203 to a level directly at an upper end of the bottom 206 in this embodiment), the bottle 201 has a laminar structure having the intermediate layer 213 of a nylon resin sandwiched between the outer layer 211a and the inner layer 211b, both of which are the substrate layers 211 made of a PET resin, i.e., the main resin, as shown in the plane cross-sectional view of FIG. 4. In addition, the intermediate layer 213 is segmented in the circumferential direction by eight vertical connecting zones 114, where the outer layer 211a, one of the substrate layers 211, is connected directly to the inner layer 211b, another substrate layer 211. The eight vertical connecting zones 214 are disposed in parallel in the circumferential direction and vertically along the central axial direction. The front view of FIG. 3 shows the regions laminated with intermediate layer 213 as cross-hatched areas for the convenience of easy understanding. In fact, however, the intermediate layer 213 is in close contact with the substrate layers, i.e., with the outer layer 211a or the inner layer 211b, and the bottle has clear appearance.

In the case of conventional pressure resistant PET bottles of this type, the impact of fall, etc., creates shear force which acts on the interfaces between the intermediate layer and the outer layer or the inner layer, thus causing partial delamination to occur. Once a partially delaminated portion appears, especially in the bottles used for carbonated beverages, carbon dioxide penetrates the inner layer in this partially delaminated portion, and enters the interface between the inner layer of a PET resin and the intermediate layer made of a gas barrier resin. Because of the pressure of carbon dioxide that has entered the interface, the delamination goes on further until it becomes obvious that light scatters or reflects at the delaminated interface so that the delamination is visible from outside. This problem of delamination gives damage to the appearance and gives the users anxiety about quality of the product. In contrast, the bottle 201 of this embodiment has an action-and-effect of the vertical connecting zones 214 that segment the intermediate layer 213 in the circumferential direction into multiple strips (eight in this embodiment). Even if there occurs partial delamination in a strip, these vertical connecting zones 214 can prevent further delamination from proceeding and propagating from one place to another. Since the delamination, if any, only occurs in a limited region or regions, the bottle 201 retains good appearance and remains in a clear state.

Figure 5:
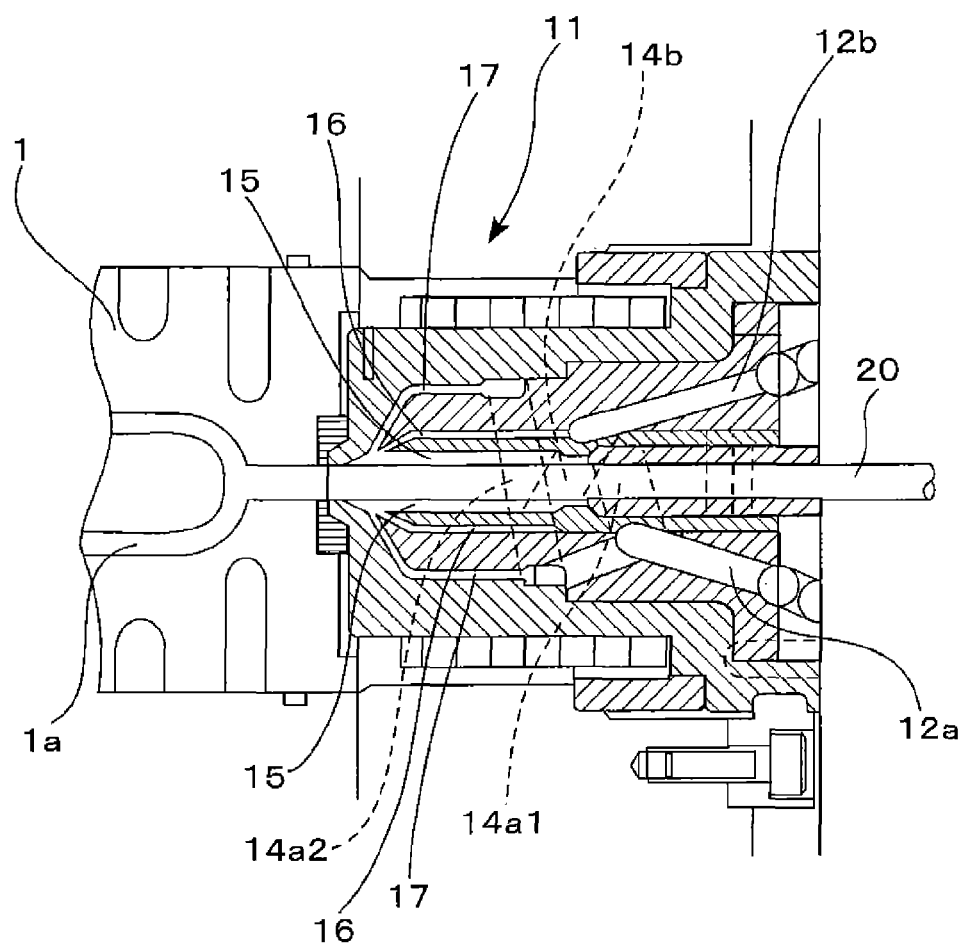
FIG. 5 is a vertical section showing the nozzle section of the injection molding device in one embodiment of this invention.
Figure 6:
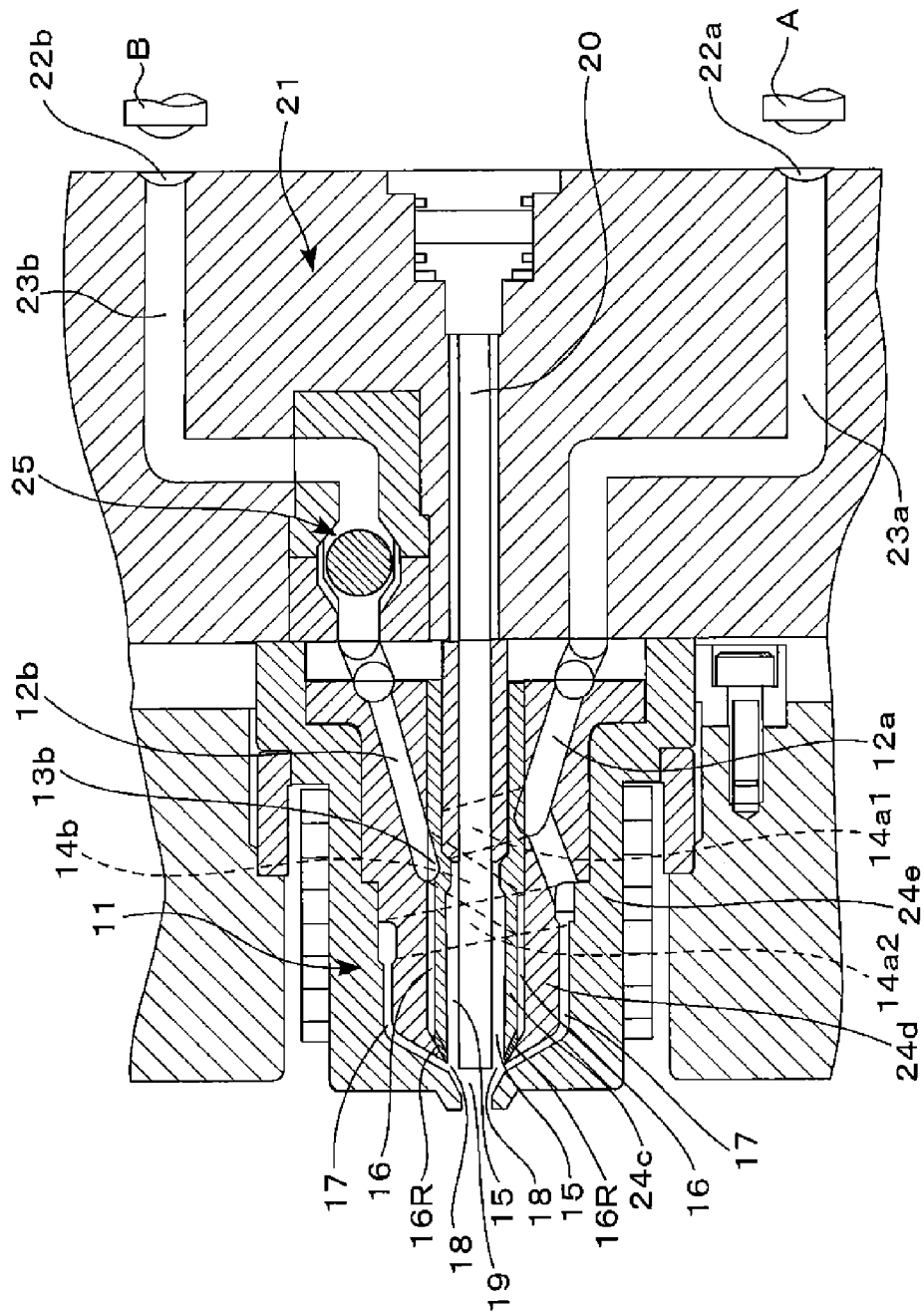
FIG. 6 is a vertical section of the nozzle section of FIG. 5, to which a hot runner block has been fitted.
Figure 7:
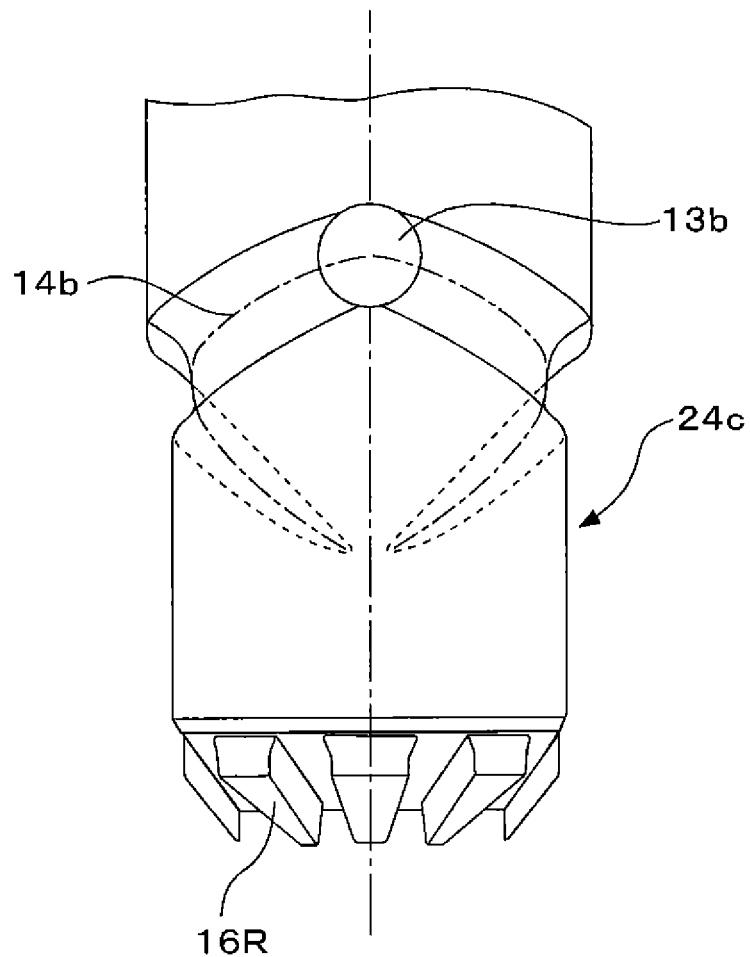
FIG. 7 is a front view of the first ring mandrel that forms the middle flow channel in the nozzle section of FIG. 6.
Figure 8:
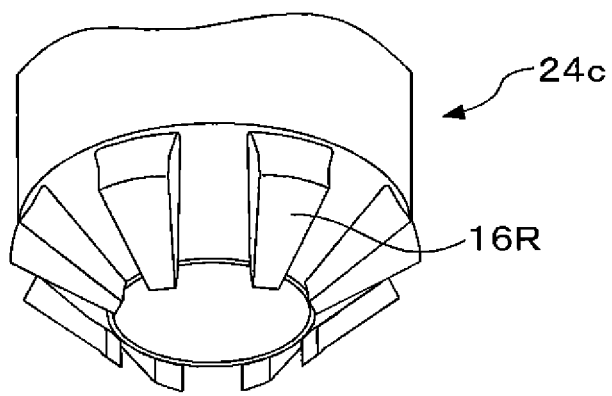
FIG. 8 is a diagrammatic perspective view taken from an obliquely upward line of sight, which shows a lower portion of the first ring mandrel shown in FIG. 7.
Figure 9:
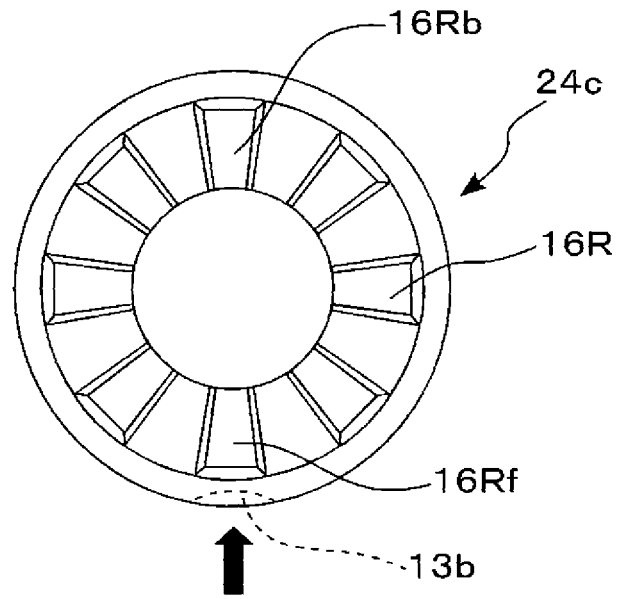
FIG. 9(a) is a bottom view of the first ring mandrel shown in FIG. 7.
FIG. 9(b) is a bottom view of the first ring mandrel that has been used in injection molding the preform of a comparative example.
Figure 9:
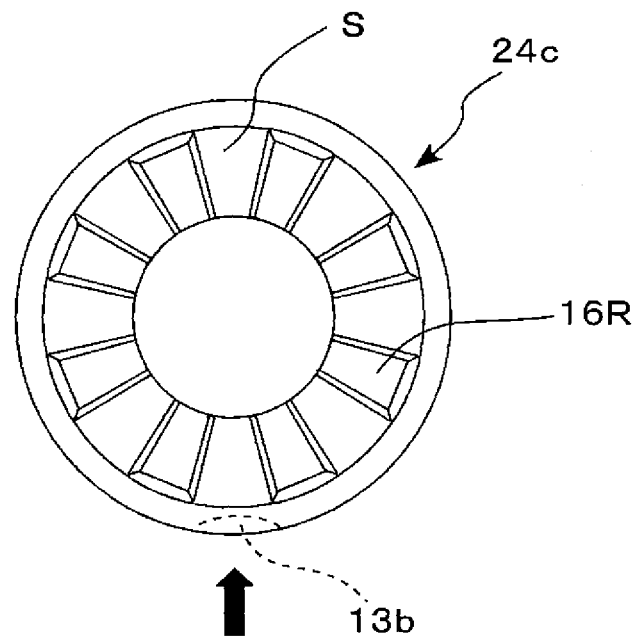

FIGS. 5-9 show the injection molding device in one embodiment of this invention. Specifically, FIG. 5 is a vertical section showing an example of the nozzle section 11, to which a mold 1 has been fitted on the downstream side. FIG. 6 is a vertical section of the nozzle section 11 of FIG. 5, to which a hot runner block 21 has been fitted on the upstream side. FIGS. 7, 8, and 9(a) are a front view, a perspective view taken from an obliquely upward line of site, and a bottom view, respectively, of the first ring mandrel 24c that forms the middle flow channel 16. This injection molding device is used to injection mold the preform 101 shown in FIG. 1, and comprises resin feeders A, B, which supply two different molten resins separately, the nozzle section 11 where the two molten resins are laminated with each other, and the mold 1 for molding the preform.

The nozzle section 11 has three layer-forming flow channels, i.e., the cylindrical inner and outer flow channels 15, 17, which form the inner layer 111b and the outer layer 111a, both of which are the substrate layers 111 of the preform 101, and the cylindrical middle flow channel 16, which forms the intermediate layer 113. The three flow channels are formed by a combination of a shutoff pin 20, the first ring mandrel 24c, a second ring mandrel 24d, and a third ring mandrel 24e, all of which are disposed a coaxially cylindrical configuration. The three cylindrical layer-forming flow channels have tapered cylindrical portions at respective downstream ends. On the downstream side of these tapered cylindrical portions, there is a confluence 18 where the resins join together after leaving the corresponding tapered portions of the layer-forming flow channels. From the confluence 18 onward, the resins run through a joined flow channel 19. In the tapered end portion on the downstream side of the cylindrical middle flow channel 16, there are eight vertical blocking rib pieces 16R, which are disposed in parallel in the circumferential direction at intervals of an equal central angle. These rib pieces 16R are laid to stand in the way of the resin flowing through the middle flow channel 16 so that the intermediate layer is segmented into eight small streams.

FIGS. 7, 8, and 9(a) show a detailed shape of the first ring mandrel 24c that makes up the inner peripheral wall of the middle flow channel 16. As shown in the front view of FIG. 7, a manifold 14b is disposed in a bilaterally symmetric shape and is used as groove-like conduits to distribute the molten resin to the cylindrical flow channel by way of an inflow port 13b for passing the molten intermediate-layer resin (See also FIG. 6). The tapered portion at the downstream end is provided with eight vertical blocking rib pieces 16R which are disposed in parallel in the circumferential direction at equal central-angle intervals.

As shown in FIG. 9(a), the eight vertical blocking rib pieces 16R are disposed in the circumferential direction at equal central angle intervals in such a way that one (16Rb) of the predetermined number of the vertical blocking rib pieces 16R is set at a circumferential position opposed by 180 degrees to the position of the inflow port 13b, which is disposed at a position corresponding to the starting point for the manifold 14b. In FIG. 9(a), a bold arrow indicates the direction of resin inflow.

Meanwhile, FIG. 9(b) is a bottom view of the first ring mandrel 24c that has been used to mold the preform in the comparative example shown in FIG. 2(b). In this case, the eight vertical blocking rib pieces 16R are shifted by 22.5 degrees from their positions in FIG. 9(a) showing the first ring mandrel 24c which is used to mold the preform of the embodiment shown in FIG. 2(a). According to these shifted positions of rib pieces 16R shown in FIG. 9(b), a gap S between two adjacent vertical blocking rib pieces 16R comes to the circumferential position opposed by 180 degrees to the position of the inflow port 13b.

The preform 101 of this embodiment shown in FIG. 2(a) and the preform 101 of the comparative example shown in FIG. 2(b) were injection molded by the same molding device under the same molding conditions, except that the circumferential positions of eight vertical blocking rib pieces 16R have been shifted by 22.5 degrees. It has been confirmed from a comparison of these two preforms that when the vertical blocking rib pieces 16R are disposed appropriately in the circumferential direction, the preform 101 of this embodiment shown in FIG. 2(a) could have a height difference, hd, of the leading edge, LE, that is considerably smaller than found in the preform 101 of the comparative example.

As shown in FIG. 9(a), one rib piece 16Rb among the eight vertical blocking rib pieces 16R is set at a circumferential position opposed by 180 degrees to the position of the inflow port 13b. In this way, that vertical blocking rib piece 16Rb acts as a baffle plate for the resin flow, and delays the time of arrival for the resin to reach the downstream end at a circumferential position where the arrival of resin is otherwise earliest. It is presumed that this delay holds back the peak height of the maximum height point of the leading edge, LE, which appears in the preform 101, and minimizes the height difference. Meanwhile, in the case of FIG. 9(b), a gap S between two adjacent vertical blocking rib pieces 16R is located at the circumferential position at which the time is earliest for the resin to reach the downstream end. Under this configuration, the maximum height point of the leading edge, LE, would have a great peak height. It is noted here that the bilaterally central position at the rear of the preform shown in FIGS. 2(a) and 2(b), that is, the circumferential position of the minimum height point, Pmin, corresponds to the circumferential position indicated by an arrow in FIGS. 9(a) and 9(b) where the inflow port 13b is located.

Figure 2:
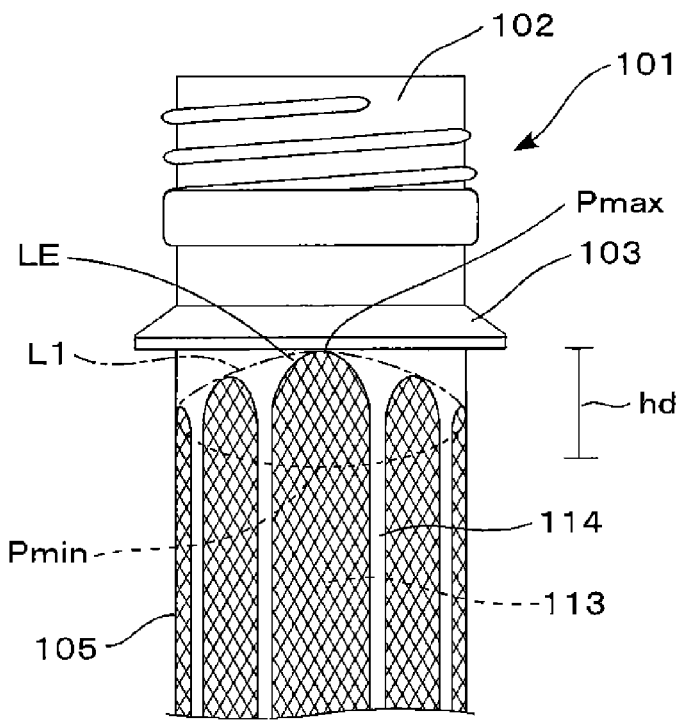
FIG. 2(a) is a schematic explanatory diagram of the preform in the embodiment of FIG. 1(a)
FIG. 2(b) is that of the preform in a comparative example, both showing fluctuations in the behavior of the leading edge of the intermediate layer.
Figure 2:
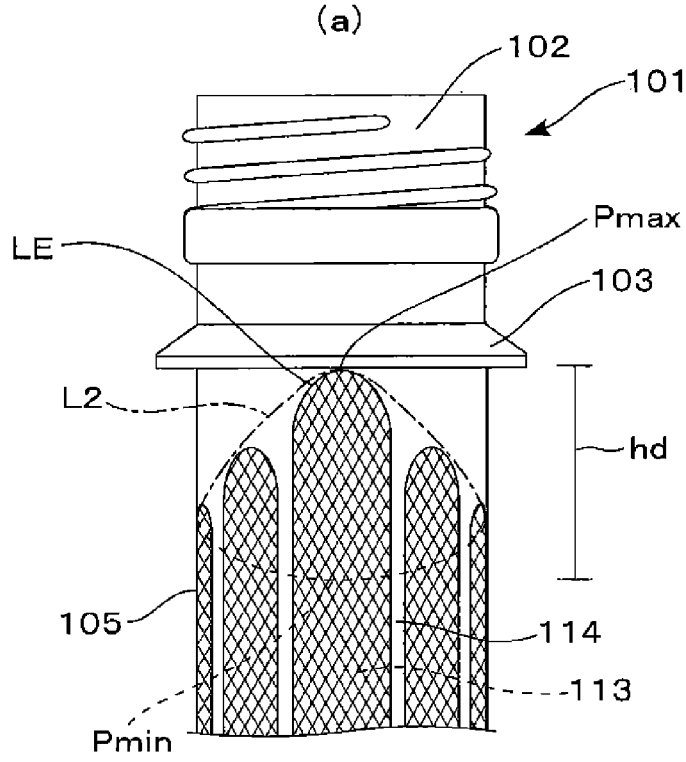

Described below is an outline of the process for molding the laminated preform 101 shown in FIGS. 1 and 2 by using the above-described injection molding device. As shown in FIGS. 5 and 6, the main resin of a PET resin is supplied from a resin feeder A, fed into a feed port 22a, and is passed through the feed channel 23a inside the hot runner. The intermediate-layer resin of a nylon resin is supplied from a resin feeder B, fed into a feed port 22b, and is passed through a feed channel 23b. The two resins are fed into the nozzle section 11 at predetermined timing, are joined inside the nozzle section 11, and the joined resins are sent to a cavity 1a of the mold 1 to fill the cavity. A check valve 25 with a function for preventing backflow by means of a ball valve is disposed in the feed channel 23b at a point near the connection to the nozzle section 11 so that the supply of the intermediate-layer resin can be started and stopped in a short period of time with a high degree of accuracy.

The main resin is then passed through a guide channel 12a which is connected to the feed channel 23a. Ahead of the guide channel 12a, the resin flow is branched into two manifolds 14a1 and 14a2. The resin entering the manifold 14a1 goes into the cylindrical inner flow channel 15, and the resin entering the manifold 14a2 goes into the cylindrical outer flow channel 17. The intermediate-layer resin is sent from the other feed channel 23b to a guide channel 12b, and then at the inflow port 13b, the resin enters the manifold 14b and goes into the cylindrical middle flow channel 16.

At the confluence 18, the intermediate-layer resin coming from the middle flow channel 16 is already layered in a cylindrical shape, and is flowed between the main resin layers from the inner and outer flow channels 15, 17. Inside the subsequent joined flow channel 19, the intermediate layer is disposed between the main resin layers in a coaxially cylindrical configuration over a predetermined period of time to form a multi-layered molten resin fluid, which is injected into the cavity 1a of the mold 1 to fill the cavity with molten resins (See FIG. 5). At that time, the intermediate-layer resin, which has been layered in a cylindrical shape in the middle flow channel 16, is segmented in the circumferential direction by the eight vertical blocking rib pieces 16R disposed circumferentially in parallel at the downstream end of the middle flow channel 16. Thus, the intermediate layer is laminated between the main resin layers in this segmented state.

Figure 10:
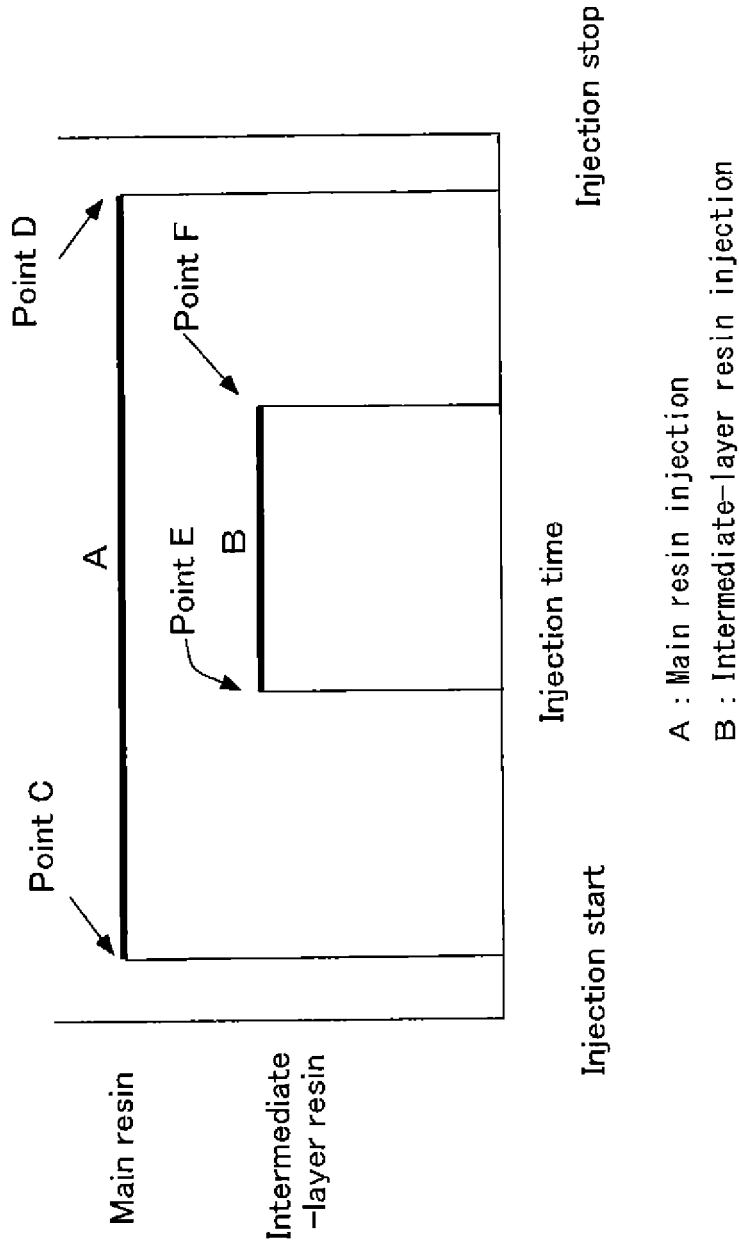
FIG. 10 is an explanatory diagram showing an example of the injection pattern used to mold the preform of FIG. 1.
Figure 11:
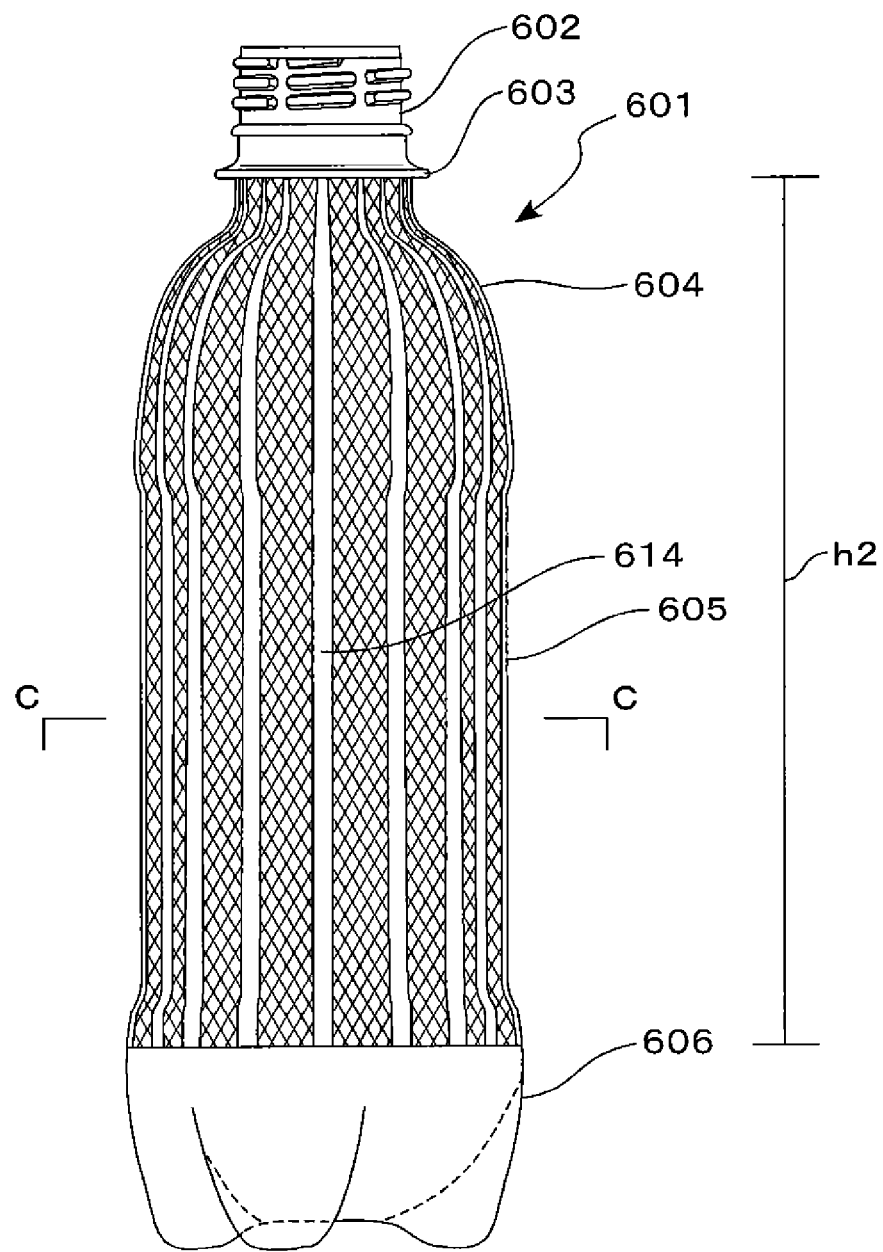
FIG. 11 is a front view of an exemplified conventional bottle.
Figure 12:
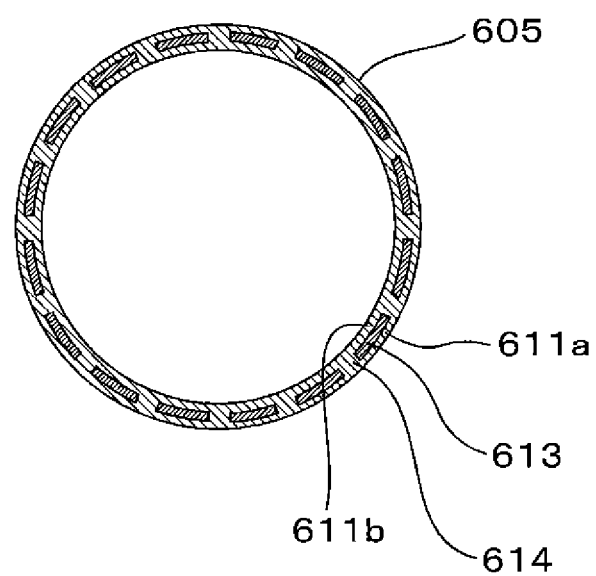
FIG. 12 is a front view of a plane cross-sectional view of the bottle taken from line C-C in FIG. 11.
Figure 13:
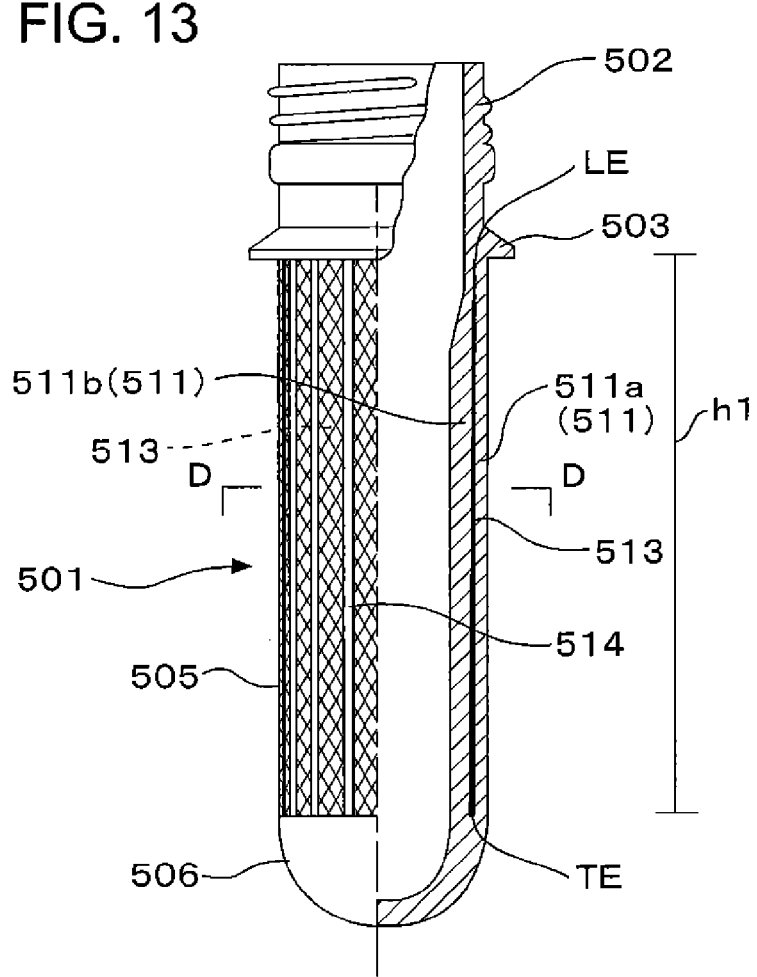
FIG. 13(a) is a front view, with a right half in a partial vertical section.
FIG. 13(b), a plane cross-sectional view, of the preform used in molding the bottle of FIG. 11
Figure 13:
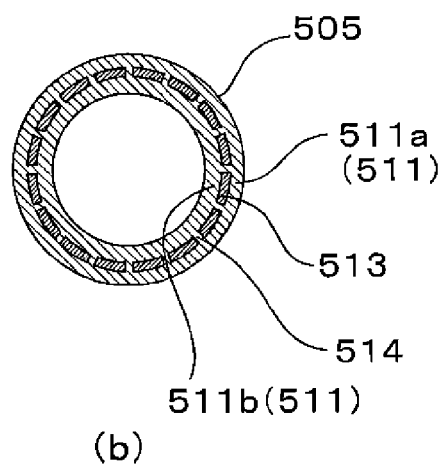

FIG. 10 shows an exemplified injection pattern used for both the main resin and the intermediate-layer resin. It is a schematic diagram depicted with time as the lateral axis and injection speed as the vertical axis. This injection pattern is one of the so-called simultaneous injection molding patterns. The preform 101 shown in FIG. 1 can be molded by using the above-described injection molding device wherein the main resin is injected during a period starting at point C and ending at point D, while the intermediate-layer resin is simultaneously injected during a period starting at point E and ending at point F. The start and stop of the supply of the intermediate-layer resin respectively at point E and point F are performed by a check valve 25 disposed in the feed channel 23b.

The injection molding device and preform of this invention have been described above with respect to preferred embodiments. However, it is to be understood that this invention should not be construed as limitative to these embodiments. In the embodiment of the injection molding device, one of the vertical blocking rib pieces 16R is disposed at a position opposed by 180 degrees to the position of the inflow port 13b that allows the resin to flow into the middle flow channel 16 so that the height difference in the leading edge, LE, would be minimized. There may be a case where the circumferential position, at which the resin runs down the middle flow channel 16 and reaches the cylindrical downstream end in a shortest period of time, does not coincide with the position opposed by 180 degrees to the inflow port 13b due to the effects of groove shape, etc., of the manifold 14b. Even in such a case, the circumferential position, at which the resin reaches the cylindrical downstream end in the shortest period of time, can be predicted from the circumferential position at which there appears the maximum height point, Pmax, of the leading edge LE. Furthermore, this circumferential position for the resin to reach the cylindrical downstream end in the shortest period of time can be calculated by computer simulation and experiments on the cylindrical middle flow channel 16, including a groove shape condition for the manifold 14b. Based on the results of this forecast, the vertical blocking rib pieces 16R can be disposed appropriately in the circumferential direction.

For example, the manifold 14b shown in FIG. 7 has a structure in which the cross-sectional area of each groove would decrease gradually from upstream to downstream. If the grooves of the manifold 14b have a constant cross-sectional area ranging from upstream to downstream, then the resin would reach the cylindrical downstream end most quickly at the same circumferential position as that of the inflow port 13b. Therefore, as shown in FIG. 9(a), it is only necessary for the vertical blocking rib pieces 16R to be disposed in the same way as in the above embodiment, so that the time of resin arrival at the downstream end can be delayed by the vertical blocking rib piece 16Rf disposed at a corresponding position, which in this case, is the same circumferential position as that of the inflow port 13b. As a result, the height difference in the leading edge, LE, can be likewise minimized.

The injection molding device shown in FIGS. 5 and 6 is merely an example. There can be numerous variations within the feasible scope of the subject-matter of this invention. As regards the configuration of the middle flow channel 16 shown in FIG. 7 and other figures, the shape of the manifold 14b is not limited to the shape shown in the above embodiment, in which groove-like conduits starting from the inflow port 13b wind obliquely downward in both the left and right directions in a bilaterally symmetric pattern. Other variations can be appropriately adopted, for example, by allowing a groove-like conduit starting from the inflow port 13b to go winding obliquely downward only in one direction, while giving consideration to the viscosity of the molten intermediate-layer resin. Also, as regards the configuration of the vertical blocking rib pieces 16R, factors to be considered include the number and shape of the rib pieces and what place the rib pieces are disposed in at the downstream end of the middle flow channel 16, etc. These factors can be determined appropriately, while giving consideration to an inhibitive effect of the vertical connecting zones on the progress of delamination between the substrate layers and the intermediate layer in the body of the bottle, the injection molding property and the biaxial stretching and blow molding property, of the preform, and the gas barrier property of the bottle.

The preform in the above embodiment has a laminar structure of 2-resin/3-layers, as shown in the plane cross-sectional view of FIG. 1(b). However, according to the features associated with the injection molding device of this invention, the preform can have various laminar structures, such as 2-resins/3-layers, 2-resins/5-layers, 3-resin/4-layers, 3-resins/5-layers, and the like. This can be achieved by increasing the number of cylindrical flow channels in the nozzle section appropriately within the scope of the feature that both sides of any intermediate layer are laminated with the substrate layers. The above embodiment uses a PET resin as the substrate resin and a nylon resin as the intermediate-layer resin. However, various combinations of resin can obviously be used by taking into consideration the purpose of using the bottles, easiness with which to mold the preform and the bottle, and functions expected for the intermediate layer. Although FIGS. 3 and 4 show a round bottle, it is also possible to mold a square or rectangular bottle. Since in that case, the bottle shape is not isotropic, the positions of a multiple number of the vertical connecting zones can be determined in the circumferential direction, while considering angular positions where delamination tends to occur, and not the intervals based on an equal central angle, such as shown in FIGS. 3 and 4.

INDUSTRIAL APPLICABILITY

According to the injection molding device of this invention and the preform produced by this injection molding device, the delamination between the substrate layers and the intermediate layer can be inhibited from proceeding. Moreover, it becomes possible to provide a bottle having a laminar structure in which the leading edge of the intermediate layer has a minimized height difference between the maximum and minimum height points. Thus, a wide variety of use applications are expected in the fields of carbonated beverages.

DESCRIPTION OF REFERENCE SIGNS

1. Mold
1a. Cavity
11. Nozzle section
12a. Guide channel (for the main resin)
12b. Guide channel (for the intermediate-layer resin)
13b. Inflow port (for the intermediate-layer resin)
14a1, 14a2, and 14b. Manifold
15. Inner flow channel
16. Middle flow channel
16R. Vertical blocking rib piece
17. Outer flow channel
18. Confluence
19. Joined flow channel
20. Shut-off pin
21. Hot runner block
22a. Feed port (for the main resin)
22b. Feed port (for the intermediate-layer resin)
23a. Feed channel
23b. Feed channel
24c. First ring mandrel
24d. Second ring mandrel
24e. Third ring mandrel
25. Check valve
A. Feeder (for the main resin)
B. Feeder (for the intermediate-layer resin)
101, 501. Preform
102, 502. Neck
103, 503. Neck ring
105, 505. Body
106, 506. Bottom
111, 511. Substrate layer
111a, 511a. Outer layer (Substrate layer)
111b, 511b. Inner layer (Substrate layer)
113, 513. Intermediate layer
114, 514. Vertical connecting zone
h1. Height range
hd. Height difference
L1, L2. Envelope curve
LE. Leading edge
TE. Trailing edge
Pmax. Maximum height point
Pmin. Minimum height point
201, 601. Bottle
202, 602. Neck
203, 603. Neck ring
204, 604. Shoulder
205, 605. Body
206, 606. Bottom
211, 611. Substrate layer
211a, 611a. Outer layer (Substrate layer)
211b, 611b. Inner layer (Substrate layer)
213, 613. Intermediate layer
214, 614. Vertical connecting zone
h2. Height range

The invention claimed is:

1. A device for injection molding a preform in a shape of a test tube used in a biaxial stretching and blow molding operation, in which at least one intermediate layer is laminated with substrate layers made of a main resin, the device having a nozzle section for laminating the main resin with a resin that forms the intermediate layer, said nozzle section comprising:

three cylindrical layer-forming flow channels disposed in a coaxial cylindrical configuration, which include:
an inner flow channel and an outer flow channel for forming the substrate layers of the main resin, and
a middle flow channel located between the inner flow channel and the outer flow channel and used to form the intermediate layer made of an intermediate-layer resin, which resin is distributed in a molten state to the middle flow channel by way of a manifold that comprises groove-shaped conduits, and
a predetermined number of vertical blocking rib pieces disposed at an end of the middle flow channel on a downstream side, in parallel in a circumferential direction, so that the intermediate layer is segmented in the circumferential direction into a predetermined number of vertically running streams,
wherein the vertical blocking rib pieces are disposed in the circumferential direction in such a way that one of the predetermined number of the vertical blocking rib pieces is located at a circumferential position opposed by 180 degrees to a position of an inflow port, which is disposed at an upstream end of the manifold to allow the intermediate layer resin to flow into the middle flow channel configured to minimize a difference in height between a maximum height point and a minimum height point that appears in a leading edge of the intermediate layer of the preform, and wherein a circumferential position where the maximum height point of the leading edge which appears in the preform is located at the circumferential position opposed by 180 degrees to the position of the inflow port.

* * * * *